United States Patent Office 3,454,525
Patented July 8, 1969

3,454,525
POLY-ALPHA-OLEFIN COMPOSITIONS CONTAINING SYNERGISTIC STABILIZER COMBINATION
Clarence E. Tholstrup, Kingsport, Tenn., assignor to Eastman Kodak Company, Rochester, N.Y., a corporation of New Jersey
No Drawing. Continuation-in-part of application Ser. No. 579,780, Sept. 15, 1966. This application Oct. 9, 1967, Ser. No. 673,982
Int. Cl. C08f 45/58
U.S. Cl. 260—45.85                4 Claims

ABSTRACT OF THE DISCLOSURE

A solid poly-alpha-olefin composition comprining a solid poly-alpha-olefin and a stabilizing amount of a stabilizer combination of a dialkyl ester of 3,3' - thiodipropionic acid and a substituted phenol of the following formula

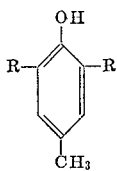

wherein each R is an alkyl radical having 13–18 carbon atoms.

DISCLOSURE

This application is a continuation-in-part of U.S. Ser. No. 579,780, filed Sept. 15, 1966, now abandoned which, in turn, is a continuation of U.S. Ser. No. 509,668, filed Nov. 24, 1965, now abandoned, which was a continuation-in-part of U.S. Ser. No. 211,826, filed July 23, 1962, now abandoned, which was a continuation-in-part of U.S. Ser. No. 54, filed Jan. 4, 1960, now abandoned.

This invention relates to new poly-alpha-olefin compositions. Preferred embodiments of the invention relate to polyethylene and polypropylene compositions having improved stability at elevated temperatures to oxidative degradation.

Poly-alpha-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-alpha-olefins, such as in electrical insulation and the like, often expose the poly-alpha-olefin to elevated temperatures. To minimize oxidative deterioration in poly-alpha-olefins, antioxidants or stabilizers are often incorporated therein.

It is an object of this invention to provide new poly-alpha-olefin compositions having improved resistance to thermal degradation.

It is another object of this invention to provide new synergistic combinations of stabilizers for poly-alpha-olefin compositions.

It is also an object of this invention to provide novel polyethylene and polypropylene compositions containing synergistic combinations of compounds that improve the stability of polyethylene and polypropylene compositions against deterioration resulting from exposure to elevated temperatures.

Other objects of the invention will be apparent from the description and claims that follow.

The present invention comprises poly-alpha-olefin compositions having incorporated therein a stabilizer combination of a diester of 3,3'-thiodipropionic acid and certain substituted phenols.

The diesters of 3,3'-thiodipropionic acid comprising the present stabilizer combination have the following formula:

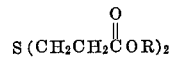

wherein R is an alkyl radical having at least 4 and generally 4 to 20 carbon atoms, with 8 to 18 carbon atoms being preferred. A particularly effective ester has twelve carbon atoms for the R substituent, namely, dilauryl 3,3'-thiodipropionate. However, any diester of 3,3'-thiodipropionic acid as described above can be employed in the present stabilizer combination including the butyl, amyl, hexyl, heptyl, octyl, nonyl, decyl, tridecyl, myristyl, pentadecyl, cetyl, heptadecyl, stearyl, and eicosyl diesters of 3,3'-thiodipropionic acid and mixtures thereof.

A wide variety of substituted phenols can be effectively utilized in combination with the described diesters of 3,3'-thiodipropionic acid, including those having the following general formulas:

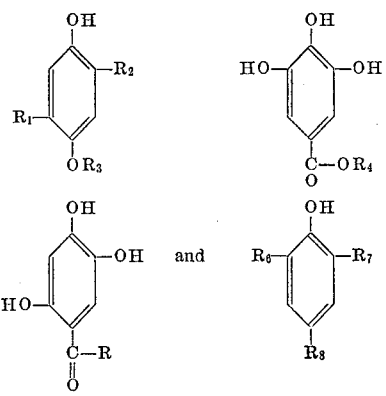

In the above substituted phenol formulas $R_3$, $R_4$ and $R_5$ are alkyl radicals desirably having 1 to 18 carbon atoms and preferably 1 to 12 carbon atoms. $R_1$, $R_2$ and $R_8$ are hydrogen atoms, alkyl radicals desirably having 1 to 18 carbon atoms and preferably 1 to 12 carbon atoms or cyclic hydrocarbon radicals desirably having 6 carbon atoms in the cyclic nucleus and preferably 1-alkyl-cyclohexyl radicals or 1-alkylbenzyl radicals with the alkyl radical having desirably 1 to 18 and preferably 1 to 12 carbon atoms. $R_6$ and $R_7$ are hydrogen atoms, alkyl radicals having generally 1 to 40 carbon atoms, including 1 to 18 carbon atoms, and preferably 13 to 18 carbon atoms, or cyclic hydrocarbon radicals desirably having 6 carbon atoms in the cyclic nucleus and preferably 1-alkylcyclohexyl radicals or 1-alkylbenzyl radicals with the alkyl radical having desirably 1 to 18 and preferably 1 to 12 carbon atoms. At least one of $R_1$ and $R_2$ is other than a hydrogen atom and at least two of $R_6$, $R_7$ and $R_8$ are other than hydrogen atoms. The substituent $R_2$ and at least one of $R_6$ and $R_7$ are preferably tertiary alkyl radicals, 1-methylbenzyl radicals or 1-methylcyclohexyl radicals.

Typical substituted phenols comprising the stabilizer combination of the invention include:

2-tert.-butyl-4-methoxyphenol,
3-tert.-butyl-4-methoxyphenol,
3-tert.-octyl-4-methoxyphenol,
2-methyl-4-methoxyphenol,
2-stearyl-4-n-butoxyphenol,
3-tert.-butyl-4-stearyloxyphenol,
3-tert.-octyl-4-methoxyphenol,
3-lauryl-4-ethoxyphenol,
2,5-di-tert.-butyl-4-methoxyphenol,
2-methyl-4-methoxyphenol,
2-(1-methylcyclohexyl)-4-methoxyphenol,
2-tert.-butyl-4-dodecyloxyphenol,
2-(1-methylbenzyl)-4-methoxyphenol,
2-tert.-octyl-4-methoxyphenol,
Methyl gallate,
n-Propyl gallate,
n-Butyl gallate,
Lauryl gallate,
Myristyl gallate,
Stearyl gallate,
2,4,5-trihydroxyacetophenone,
2,4,5-trihydroxy-n-butyrophenone,
2,4,5-trihydroxystearophenone,
2,6-ditert.-butyl-4-methylphenol,
2,6-ditert.-octyl-4-methylphenol,
2,6-ditert.-butyl-4-stearylphenol,
2-methyl-4-methyl-6-tert.-butylphenol,
2,6-distearyl-4-methylphenol,
2,6-dilauryl-4-methylphenol,
2,6-di(n-octyl)-4-methylphenol,
2,6-di(n-hexadecyl)-4-methylphenol,
2,6-di(1-methylundecyl)-4-methylphenol,
2,6-di(1-methylheptadecyl)-4-methylphenol,
2,6-di(trimethylhexyl)-4-methylphenol,
2,6-di(1,1,3,3-tetramethyloctyl)-4-methylphenol,
2-n-dodecyl-6-tert. butyl-4-methylphenol,
2-n-dodecyl-6-(1-methylundecyl)-4-methylphenol,
2-n-dodecyl-6-(1,1,3,3-tetramethyloctyl)-4-methylphenol,
2-n-dodecyl-6-n-octadecyl-4-methylphenol,
2-n-dodecyl-6-n-octyl-4-methylphenol,
2-methyl-6-n-octadecyl-4-methylphenol,
2-n-dodecyl-6-(1-methylheptadecyl)-4-methylphenol,
2,6-di(1-methylbenzyl)-4-methylphenol,
2,6-di(1-methylcyclohexyl)-4-methylphenol,
2-(1-methylcyclohexyl)-4-methylphenol,
2-(1-methylbenzyl-4-methylphenol, and related substituted phenols.

The combination of the described diesters of 3,3'-thiodipropionic acid and the substituted phenols can be used to stabilize a wide variety of solid poly-alpha-olefin compositions against deterioration resulting from exposure to elevated temperatures. Any of the normally solid polymers of alpha-monoolefinic aliphatic hydrocarbons containing 2 to 10 carbon atoms can be stabilized in accordance with the invention. The subject stabilizer combinations are preferably used in polyethylene and polypropylene, especially polypropylene, although such poly-alpha-olefins as poly(3-methylbutene-1), poly(4-methylpentene-1), poly(pentene-1), poly(3,3-dimethylbutene-1), poly-(4,4-dimethylbutene-1), poly(octene-1), poly(decene-1) and the like can also be stabilized with the subject stabilizer combinations. Both the so-called "low density" and "high density' or high crystallinity poly-alpha-olefin compositions can be stabilized in accordance with the invention. Reference is made to Fawcett et al. U.S. Patent No. 2,153,553, granted Apr. 11, 1939, and to the U.S. Patent No. 2,912,429 to Cash, and the U.S. Patent No. 2,917,500 to Hagemeyer et al., with regard to the preparation of various poly-alpha-olefin compositions that can be stabilized against thermal degradation in accordance with the invention. The additive stabilizer combinations of the invention are especially useful for stabilizing the solid resinous poly-alpha-olefins having average molecular weights of at least 15,000 and more usually at least 20,000, although the stabilizer combinations of the invention can also be utilized to stabilize the so-called poly-alpha-olefin waxes having lower average molecular weights of usually 3,000 to 12,000.

The amount of the combination of the diester of 3,3'-thiodipropionic acid and the substituted phenol employed in poly-alpha-olefin compositions in accordance with the invention can be widely varied, the stabilizing amount of this combination usually varying with the particular use to which the poly-alpha-olefin compositions are to be put. Concentrations of at least about 0.001% of each stabilizer component are suitable, although 0.001% to 5% for each stabilizer component are generally used, with about 0.01% to 3% of the diester of 3,3'-thiodipropionic acid and about 0.01% to 1% of the substituted phenol being preferred, the concentration being based on the weight of the poly-alpha-olefin. We generally utilize the combination of the subject stabilizers at a weight ratio of the diester of 3,3'-thiodipropionic acid to the substituted phenol in the range of 1:100 to 100:1, and preferably 1:50 to 50:1.

The stabilizer combination of the invention can be incorporated or blended into poly-alpha-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-alpha-olefin compositions.

The stabilizer combinations of the present invention given to poly-alpha-olefin compositions improved stability, and more particularly, improved stability against oxidative deterioration resulting from exposure to elevated temperatures. In addition, poly-alpha-olefin compositions containing the stabilizer combinations of the invention have enhanced stability against deterioration resulting from exposure to sunlight or ultraviolet light. Thus, poly-alpha-olefins stabilized in accordance with the invention have an extended life expectancy and can be used more effectively than unstabilized poly-alpha-olefins for a wide diversity of uses. Poly-alpha-olefins stabilized as described can be cast, extruded, rolled or molded into sheets, rods, tubes, pipes, filaments and other shaped articles, including the widely used films of the polymers about 0.5 to 100 mils in thickness. The present compositions can be used for coating paper, wire, metal foil, glass fiber fabrics, synthetic and natural textiles or fabrics, and other such materials.

The subject stabilizer combinations of dialkyl esters of 3,3'-thiodipropionic acid and substituted phenols are synergistic combinations, that is, the stabilizing effect of such combinations in poly-alpha-olefins is substantially greater than the additive effect of the individual stabilizers of the combination.

The invention is illustrated by the following examples of preferred embodiments thereof. In the following examples the stability of test samples of poly-alpha-olefins was determined by the following described stability tests. For the 160° C. oven stability test, a portion of each test sample to be subjected to this test was compression molded into a sheet having the dimensions 8 inches by 8 inches by 1/16 inch. For the 140° C. stress crack-free test hereinafter described, a portion of each test sample to be subjected to this test was injection molded into ASTM tensile bars 2½ inches by ½ inch by 1/16 inch having a straight central section 1 inch by ¼ inch by ⅟₁₆ inch with a ⅛ inch radius at the shoulders.

160° C. oven life test: In this test, 0.25 gram specimens (½ inch by ½ inch by ⅟₁₆ inch) are cut from a compression molded plate (8 inches by 8 inches by ⅟₁₆ inch) of the sample and placed on separate 25 millimeter watch glasses. These specimens are stored in a forced air oven at a temperature of 160° C. Periodically, one of the specimens is removed and analyzed as follows for the presence of peroxides.

The specimen is cut into 6-10 pieces and transferred to a 250 milliliter flask containing 20 milliliters of carbon tetrachloride. The pieces are digested in the carbon tetrachloride for 25 minutes over a steam bath and with frequent agitation. This aids the extraction of peroxides from the pieces since the resin portion of the pieces is not soluble in carbon tetrachloride. To the flask is then added 20 milliliters of a mixture of glacial acetic acid and chloroform at a volumetric ratio of glacial acetic acid to chloroform of 3:2, and 1 milliliter of saturated aqueous potassium iodide. The flask is stoppered and agitated for 2 minutes in subdued light. To the resulting reaction mixture in the flask is added 100 milliliters of distilled water. One milliliter of starch is added as a color indicator for iodine liberated by the peroxide. The presence of peroxides is indicated by the mixture having a blue color.

As soon as a blue color is detected upon analysis of one of the specimens, the time is noted. The time interval in hours during which specimens of the test sample were in the oven is then determined. This time interval is the 160° C. oven life of the sample.

140° C. stress crack-free test: In the test 4 tensile bar specimens of the test sample are bent into a U-shape and while so bent are mounted in a stainless steel channel ⅝ inch wide by ½ inch deep. The tensile bars and channel are placed into a forced-air oven and stored therein at a temperature of 140° C. The tensile bars are periodically examined for the appearance of cracks, visible to the unaided eye, in at least two of the tensile bar specimens. When cracks appear in at least two of the specimens, the time is noted and the residence time in the oven of the tensile bar specimens determined. This time in hours is the 140° C. stress crack-free life of the test sample.

is a commercial mixture of 2-tert.-butyl-4-methoxyphenol and 3-tert.-butyl-4-methoxyphenol.

TABLE I

| Additives: | 160° C. oven life in hours |
|---|---|
| None | 2 |
| 0.3% DLTDP | 3 |
| 0.3% DSTDP | 3 |
| 0.1% BHA | 5 |
| 0.1% 2-tert.-butyl-4-dodecyloxyphenol | 6 |
| 0.1% 2-tert.-octyl-4-methoxyphenol | 4 |
| 0.3% DLTDP+0.1% 2-tert.-butyl-4-dodecyloxyphenol | 18 |
| 0.3% DLTDP+0.1% 2-tert.-octyl-4-methoxyphenol | 15 |
| 0.3% DLTDP+0.1% BHA | 15 |
| 0.3% DSTDP+0.1% BHA | 12 |

As can be observed from the data set out in Table I, combinations of the substituted phenols and the dialkyl 3,3′-thiodipropionates are synergistic combinations, the stabilizing effect of such combinations being substantially more than the sum of the stabilizing effects of the individual components of such combination. Similar synergism is demonstrated if plastic grade polyethylene having an average molecular weight greater than 15,000, a density of about 0.91 and a melt index of 7.59 is substituted for the polypropylene or if 0.1% 2,5-ditert.-butyl-4-methoxyphenol is substituted for one of the phenols, in the described stability evaluations.

Example 2

Stabilizer combinations of the invention were incorporated into plastic grade solid polyethylene having an average molecular weight greater than 15,000, a density of about 0.91 and a melt index of about 7.59, as well as into plastic grade solid polypropylene having an average molecular weight greater than 15,000, a density of about 0.91 and an inherent viscosity of about 1.25 as determined in tetralin at 145° C. The results of the stability tests are summarized by the data set out in Table II below. The concentrations of additives in Table II are based on the weight of the poly-alpha-olefin. In Table II, "DLTDP" is dilauryl 3,3′-thiodipropionate.

TABLE II

| | 160° C. Oven Life In Hours | |
|---|---|---|
| Additives | Polyethylene | Polypropylene |
| None | 2 | 2 |
| 0.05% DLTDP | 7 | |
| 0.3% DLTDP | | 3 |
| 0.05% n-propyl gallate | 7 | 5 |
| 0.025% n-propyl gallate | | 5 |
| 0.05% lauryl gallate | | 12 |
| 0.3% DLTDP plus 0.025% n-propyl gallate | | 11 |
| 0.3% DLTDP plus 0.05% n-propyl gallate | | 13 |
| 0.05% DLTDP plus 0.05% n-propyl gallate | 17 | |
| 0.3% DLTDP plus 0.05% lauryl gallate | | 22 |

Example 1

Several samples of powdered polypropylene were mixed with dialkyl 3,3′-thiodipropionates and substituted phenols of the invention, and the resulting samples evaluated with respect to stability by the 160° C. oven life test described above. The polypropylene was a plastic grade, solid polypropylene having an average molecular weight greater than 15,000, a density of about 0.91, and an inherent viscosity of about 1.25 as determined in tetralin at 145° C. The results of the stability evaluations are summarized by the data set out in Table I below. Samples of the individual components of the various stabilizer combinations in the polypropylene, as well as the polypropylene with no additive, were included in the stability tests for comparative purposes. The concentrations of additives in Table I are based on the weight of the polypropylene. In Table I, "DLTDP" is dilauryl 3,3′-thiodipropionate, "DSTDP" is distearyl 3,3′-thiodipropionate, and "BHA"

The stabilizing effects of the above combinations of substituted phenols and dilauryl 3,3′-thiodipropionate are demonstrated to by synergistic effects by the data in Table II. Similar synergism is demonstrated if distearyl 3,3′-thiodipropionate is substituted for the dilauryl 3,3′-thiodipropionate.

Example 3

Stabilizer combinations of dilaurly 3,3′-thiodipropionate and 2,4,5-trihydroxy-n-butyrophenone were incorporated into unstabilized samples of the polyethylene and polypropylene described in Example 2 and the resulting samples were then tested for stability. For purposes of comparison, 3,3′-thiodipropionic acid and 2,4,5-trihydroxy-n-butyrophenone were also included in this stability testing. The results of the stability tests are summarized by the data set out in Table III below. The concentrations of additives in Table III are based on the weight of the poly-alpha-olefin. The Table III, "DLTDP" is dilauryl 3,3'-thiodipropionate, "TDPA" is 3,3'-thiodipropionic acid and "THBP" is 2,4,5-trihydroxy-n-butyrophenone.

TABLE III

| Additives | 160° C. Oven Life in Hours | |
|---|---|---|
| | Polyethylene | Polypropylene |
| None | 2 | 2 |
| 0.05% DLTDP | 7 | |
| 0.3% DLTDP | | 3 |
| 0.1% TDPA | | 2 |
| 0.05% THBP | 7 | 12 |
| 0.1% THBP | | 15 |
| 0.2% THBP | | 20 |
| 0.5% THBP | | 30 |
| 0.05% DLTDP plus 0.05% THBP | 17 | |
| 0.3% DLTDP plus 0.05% THBP | | 45 |
| 0.3% DLTDP plus 0.1% THBP | | 60 |
| 0.3% DLTDP plus 0.2% THBP | | 80 |
| 0.3% DLTDP plus 0.5% THBP | | 100 |
| 0.1% TDPA plus 0.05% THBP | | 14 |

As can be observed from the data set out in Table III, combinations of dilauryl 3,3'-thiodipropionate and 2,4,5-trihydroxy-n-butyrophenone are synergistic stabilizer combinations in polyethylene and polypropylene. Similar synergism results if 2,4,5-trihydroxyacetophenone or 2,4,5-trihydroxystearophenone is substituted for the 2,4,5-trihydroxy-n-butyrophenone, or if distearyl 3,3'-thiodipropionate is substituted for the dilauryl 3,3'-thiodipropionate. The closely related combination of 3,3'-thiodipropionic acid and 2,4,5-trihydroxy-n-butyrophenone, the last combination of Table III, was not a synergistic combination.

Example 4

Stabilizer combinations of dilauryl 3,3'-thiodipropionate and other substituted phenols of the invention were incorporated into samples of the polypropylene described in Example 1 and the resulting poly-alpha-olefin compositions tested for stability. The results of the stability tests are summarized by the data set out in Table IV below. The concentrations of additives in Table IV are based on the weight of the polypropylene. In Table IV, "DLTDP" is dilauryl 3,3'-thiodipropionate and "BHT" is 2,6-di-tert.-butyl-4-methylphenol.

TABLE IV

| Additives: | 160° C. oven life in hours |
|---|---|
| None | 2 |
| 0.3% DLTDP | 3 |
| 0.5% DLTDP | 4 |
| 0.1% BHT | 4 |
| 0.1% BHT+0.3% DLTDP | 15 |
| 0.1% BHT+0.5% DLTDP | 18 |
| 0.1% 2-(1-methylbenzyl)-4-methylphenol | 5 |
| 0.1% 2 - (1-methylbenzyl) - 4 - methylphenol +0.30% DLTDP | 14 |

Similar synergism of the stabilizer combination of 2,6-di-tert.-butyl-4-methylphenol and dilauryl 3,3'-thiodipropionate is demonstrated if plastic grade polyethylene having an average molecular weight greater than 15,000, a density of about 0.91 and a melt index of 7.59 is substituted for the polypropylene, or if distearyl 3,3'-thiodipropionate is substituted for the dilauryl 3,3'-thiodipropionate. Such alkylated phenols as 2,6-di-(methylbenzyl)-4-methylphenol and 3,6-diisopropyl catechol were also found to form synergistic stabilizer combinations with dilauryl 3,3'-thiodipropionate in the polypropylene. The alkyl phenol, 2,6-di-tert.-butyl-4-methylphenol, which synergizing with the dilauryl ester of 3,3'-thiodipropionic acid, was found not to synergize in polypropylene with this acid in unesterified form.

Example 5

Stabilizer combinations of dilauryl 3,3'-thiodipropionate and various 2,6-dialkyl-p-cresols were incorporated into samples of a conventional, plastic grade, solid polypropylene of the type involved in the preceding examples, and the resulting polypropylene compositions were tested for stability. The results of the stability tests are summarized by the data set out in Table V below.

The concentrations of additives in Table V are based on the weight of the polypropylene. In Table V, "DLTDP" is dilauryl 3,3'-thiodipropionate and "BHT" is 2,6-di-tert.-butyl-4-methylphenol or 2,6-di-tert.-butyl-p-cresol.

TABLE V

| | Heat Stability Data | |
|---|---|---|
| Additives | 160° C. oven life in hours | 140° C. stress crack free life in hours |
| None | 0.4 | 5 |
| 0.3% DLTDP | 1 | 100 |
| 0.3% BHT | 1.5 | 5 |
| 0.3% 2,6-di(1-methylheptyl)-p-cresol | 5 | |
| 0.3% 2,6-di(1-methylheptadecyl)-p-cresol | 2 | 7 |
| 0.3% 2,6-di(1,3,5,7-tetramethyloctyl)-p-cresol | 4 | |
| 0.3% 2,6-didodecyl-p-cresol | 60 | 420 |
| 0.3% 2,6-dioctadecyl-p-cresol | 60 | 640 |
| 0.3% 2-dodecyl-6-(1-methylheptadecyl)-p-cresol | 30 | |
| 0.3% 2-methyl-6-octadecyl-p-cresol | 30 | |
| 0.3% 2,6-dioctyl-p-cresol | 15 | |
| 0.1% DLTDP plus 0.1% BHT | 7 | 125 |
| 0.1% DLTDP plus 0.1% 2,6-di(1-methylheptyl)-p-cresol | 23 | |
| 0.1% DLTDP plus 0.1% 2,6-di(1,3,5,7-tetramethyloctyl)-p-cresol | 20 | |
| 0.1% DLTDP plus 0.1% 2,6-didodecyl-p-cresol | 250 | 690 |
| 0.3% DLTDP plus 0.1% BHT | 10 | 520 |
| 0.3% DLTDP plus 0.1% 2,6-di(1-methylheptyl)-p-cresol | 95 | |
| 0.3% DLTDP plus 0.1% 2,6-di(1,3,5,7-tetramethyloctyl)-p-cresol | 90 | |
| 0.3% DLTDP plus 0.1% 2,6-didodecyl-p-cresol | 475 | 740 |
| 0.3% DLTDP plus 0.1% 2,6-di(1-methylheptadecyl)-p-cresol | 300 | 1,000 |
| 0.3% DLTDP plus 0.1% 2,6-dioctadecyl-p-cresol | 700 | 1,000 |
| 0.3% DLTDP plus 0.1% 2-dodecyl-6-(1-methylheptadecyl)-p-cresol | 300 | 1,000 |
| 0.3% DLTDP plus 0.1% 2-methyl-6-octadecyl-p-cresol | 200 | 740 |
| 0.3% DLTDP plus 0.1% 2,6-dioctyl-p-cresol | 200 | 740 |

These data likewise show the synergistic stabilization effect on polypropylene of the combination of dilauryl 3,3'-thiodipropionate and a 2,6-dialkyl-p-cresol. These data also show that this synergistic stabilization effect is most pronounced in those combinations wherein the 2,6-dialkyl-p-cresol has alkyl substituents which together total at least 16 carbon atoms and preferably more than 24 carbon atoms.

Example 6

Stabilizer combinations of dilauryl 3,3'-thiodipropionate and a preferred 2,6-dialkyl-p-cresol were incorporated into samples of various other normally solid poly-alpha-olefins and the resulting poly-alpha-olefin compositions were tested for stability. The results of the stability tests are summarized in Table VI. The concentrations of additives in Table VI are based on the weight of the total poly-alpha-olefin contents of the resulting compositions. In Table VI, "DLTDP" is dilauryl 3,3'-thiodipropionate and "BHT" is 2,6-ditert.-butyl-4-methylphenol otherwise known as 2,6-di-tert.-butyl-p-cresol.

TABLE VI

| Additives | Heat Stability Data | | |
|---|---|---|---|
| | Polybutene-1 160° C. oven life in hours | Polydecene-1 160° C. oven life in hours | Copolymer of propylene (90% by wt.) and Butene-1 (10% by wt.) 160° C. oven life in hours |
| None | 0.5 | 1 | 0.3 |
| 0.3% DLTDP | 2 | 2 | 1 |
| 0.1% BHT | 2.5 | 1 | 1 |
| 0.1% BHT plus 0.3% DLTDP | 3.5 | 10 | 3 |
| 0.1% 2,6-didodecyl-p-cresol | 20 | 20 | 15 |
| 0.1% 2,6-didodecyl-p-cresol plus 0.3% DLTDP | 220 | 80 | 240 |

These data demonstrate that the combination of dilauryl 3,3'-thiodipropionate and a substituted phenol of this invention synergistically stabilize poly-alpha-olefins in addition to polyethylene and polypropylene.

A minor proportionate amount of unesterified 3,3'-thiodipropionic acid can be added to the subject poly-alpha-olefin compositions to minimize color formation imparted by certain phenols. Usually about 0.005% to 3%, and preferably about 0.01% to 1% by weight based on the poly-alpha-olefin of 3,3'-thiodipropionic acid is utilized.

The present invention thus provides novel poly-alpha-olefin compositors having improved stability against deterioration resulting from exposure to elevated temperatures, and particularly, it provides novel synergistic stabilizer combinations for poly-alpha-olefin compositions.

Although the invention has been described in detail with reference to preferred embodiments thereof, it will be understood that variations and modifications can be effected within the spirit and scope of the invention as described hereinabove and as defined by the appended claims:

I claim:
1. A polyolefin composition comprising
   (A) a poly-α-olefin derived from α-monoolefinic hydrocarbons having 2 to 10 carbon atoms, and
   (B) a stabilizing amount of a stabilizer combination comprising
      (1) a diester of 3,3'-thiodipropionic acid having the formula

$$S(CH_2CH_2COOR)_2$$

wherein R is an alkyl radical having 4 to 20 carbon atoms, and
      (2) a substituted phenol having the formula

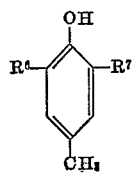

wherein $R^6$ and $R^7$ are alkyl radicals having 13 to 18 carbon atoms.

2. A polyolefin composition according to claim 1 wherein said poly-α-olefin is polyethylene or polypropylene.

3. A polyolefin composition according to claim 1 wherein $R^6$ and $R^7$ are alkyl radicals having 18 carbon atoms.

4. A polyolefin composition comprising
   (A) a poly-α-olefin derived from α-monoolefinic hydrocarbons having 2 to 10 carbon atoms, and
   (B) a stabilizing amount of a stabilizer combination comprising
      (1) dilauryl 3,3'-thiodipropionate, and
      (2) a substituted phenol having the formula

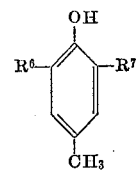

wherein $R^6$ and $R^7$ are alkyl radicals having 18 carbon atoms.

References Cited

UNITED STATES PATENTS 2,956,982  10/1960  McCall _____ 260—45.85
2,983,710   5/1961  Tholstrup _____ 260—45.85

FOREIGN PATENTS 587,296   4/1960  Belgium.

DONALD E. CZAJA, Primary Examiner.

HOSEA E. TAYLOR, Jr., Assistant Examiner.

U.S. Cl. X.R.

117—28, 124, 128.7, 132, 138.8, 155; 260—41, 45.95